United States Patent [19]

Barraco et al.

[11] Patent Number: 5,309,376
[45] Date of Patent: May 3, 1994

[54] METHODS AND APPARATUS FOR TESTING IMAGE PROCESSING APPARATUS

[75] Inventors: Ignazio Barraco, Cambs.; James Bradshaw, Lincs., both of England

[73] Assignee: Crosfield Electronics Limited, Stevenage, England

[21] Appl. No.: 779,273

[22] Filed: Oct. 18, 1991

[30] Foreign Application Priority Data

Oct. 18, 1990 [GB] United Kingdom ............. 9022710

[51] Int. Cl.⁵ .............................................. G01C 11/18
[52] U.S. Cl. ................................. 364/571.01; 348/180
[58] Field of Search ............. 364/571.01, 514, 719, 364/89, 551.01; 382/57; 340/701, 793; 358/405, 406, 10, 139; 371/15.1, 16.1, 16.4, 25.1; 395/102, 128

[56] References Cited

U.S. PATENT DOCUMENTS

| 4,554,663 | 11/1985 | Pham van Cang | 371/20 |
| 4,589,139 | 5/1986 | Hada et al. | |
| 4,654,706 | 3/1987 | Davidson et al. | 358/139 |
| 4,682,246 | 7/1987 | Efron et al. | 358/335 |
| 4,760,447 | 7/1988 | Koka et al. | 358/139 |
| 4,897,721 | 1/1990 | Young et al. | 358/139 |
| 5,032,769 | 7/1991 | Kawakami | 315/368 |

FOREIGN PATENT DOCUMENTS 0366427 5/1990 European Pat. Off. .
0390110 10/1990 European Pat. Off. .

*Primary Examiner*—Jack B. Harvey
*Assistant Examiner*—Thomas Peeso
*Attorney, Agent, or Firm*—Sughrue, Mion, Zinn, Macpeak & Seas

[57] ABSTRACT

Test equipment, for testing that an image processing apparatus is operating correctly, is coupled to the output port of the image processing apparatus. A predetermined group of signals corresponding to a portion of an image from the image processing apparatus is stored in a memory in the test equipment. The signals are then analysed either by an operator using a monitor or by electronic comparison of the signals with reference signals corresponding to the portion of the image, from a reference store.

10 Claims, 1 Drawing Sheet

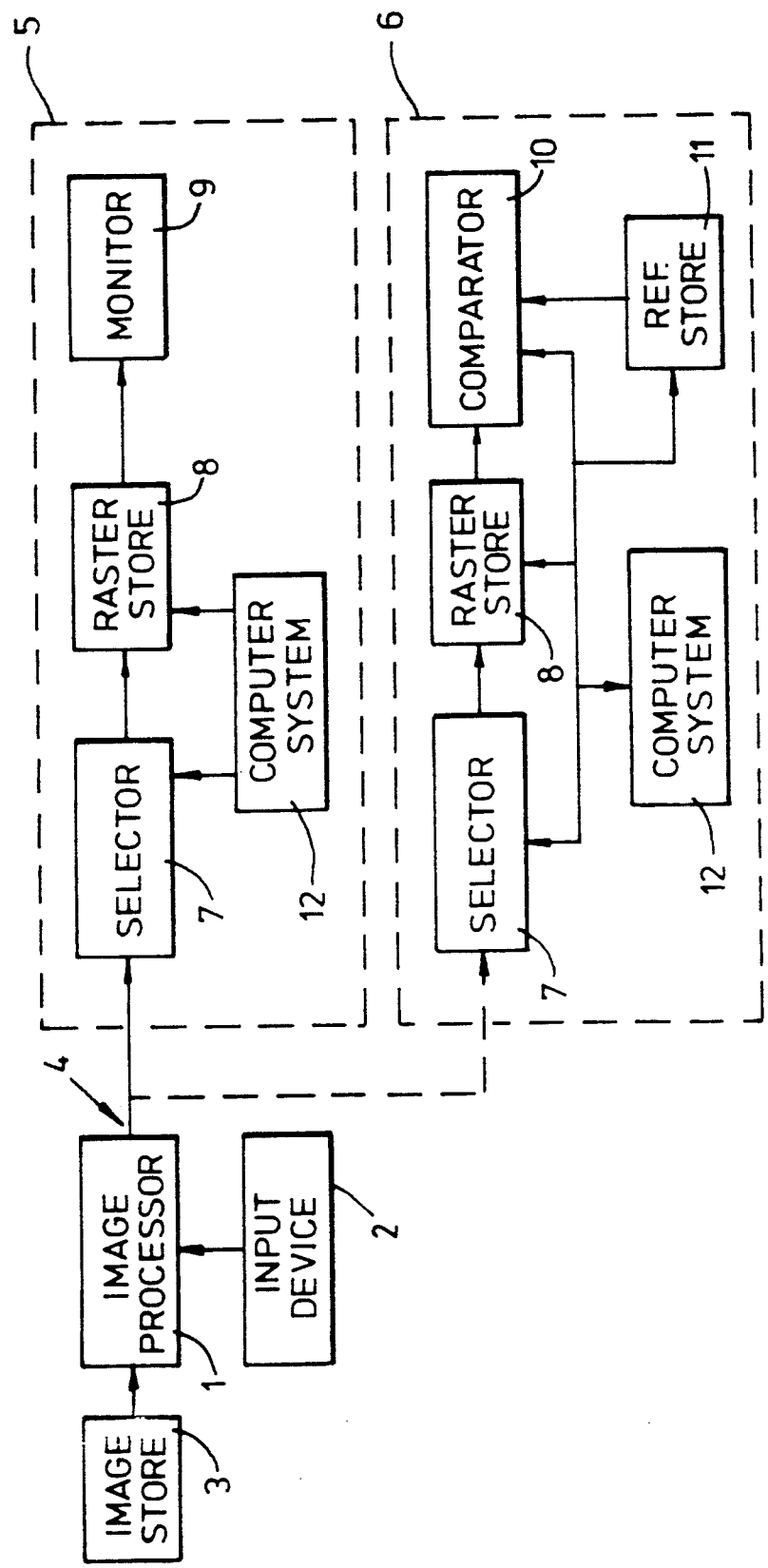

METHODS AND APPARATUS FOR TESTING IMAGE PROCESSING APPARATUS

FIELD OF THE INVENTION

The invention relates to methods and apparatus for testing image processing apparatus.

DESCRIPTION OF THE PRIOR ART

Digital image processing apparatus is well known and over the last few years various sophisticated apparatus has been developed which enables a wide variety of colo)Kr processing techniques to be achieved. Typically, this apparatus ultimately provides an output signal which is fed to an output device to enable a hard copy version of the processed image to be obtained. The output signal is generally in the form of an exposing beam control signal which is applied to a beam modulator effectively to turn the beam on or off while exposing a record medium. Commonly, the image which is exposed is in half-tone dot form.

It is necessary when constructing image processing apparatus to ensure that the output signal which is provided for use with an output device represents as accurately as possible the desired output form of the image. For example, it is important to ensure that the dot structure and screen angles in the case of a half-tone dot image are correct while other features such as the merging of text features, or a high resolution edge on a graphics image must also be checked. In the past, this has involved connecting the image processing apparatus to a hard copy output device so as to expose the image onto film. The film is then examined to see if any defects can be observed following which a correction will be made in the image processing apparatus and the test repeated.

Not only is this very time consuming in that outputting an image onto film takes some time, but also the output device itself can introduce errors. Further some errors due to the image processing apparatus such as small "blips" in half-tone dots due to timing problems and the like are very difficult to see on a film.

SUMMARY OF THE INVENTION

In accordance with one aspect of the present invention, test equipment for testing that image processing apparatus is operating correctly comprises selection means; a memory for coupling to an output port of said image processing apparatus to receive digital signals from said image processing apparatus representing an image, said selection means selecting a predetermined group of said signals for storage in said memory; and means coupled to said memory to enable said signals stored in said memory to be analysed or automatically verified.

In accordance with the second aspect of the present invention, a method of adjusting image processing apparatus to minimize operational errors comprises:

a) Attaching test equipment according to the first aspect of the invention to an output port of said image processing apparatus to receive digital signals from said image processing apparatus representing an image;
b) Storing selected signals in the memory;
c) Analyzing the stored signals;
d) Adjusting said image processing apparatus to compensate for any errors detected and repeating steps b) to d) until a satisfactory analysis of said stored signals is achieved, and thereafter removing said test equipment.

We have devised a new type of test equipment which enables image processing apparatus to be tested during manufacture and before shipping to customers which enables errors generated within the image processing apparatus to be relatively easily detected.

The test equipment could receive signals from various positions within the image processing apparatus. For example it could be positioned at the output of an input device or image store. Preferably, the signals are intended to control an image generation system to generate an image. Typically, the output port to which the test equipment is connected generates Raster format signals.

In one example, the test equipment includes a monitor coupled to the memory for displaying the portion of the image represented by the stored signals to enable that portion to be analysed by an operator. In another example, the means coupled to the memory to enable stored signals to be analysed comprises comparison means connected to a store which holds reference signals corresponding to the selected group of signals in the memory, the comparison means comparing the signals in the store with the signals in the memory and providing an indication of the result of that comparison.

In the latter case, the image processing apparatus will be arranged to process a known image so that the comparison can be made. Typically, the comparison means will compare check information corresponding to each line of the image stored in the memory. This increases the speed of the comparison so as to allow real time processing in contrast to a full pixel by pixel comparison between the two images.

BRIEF DESCRIPTION OF THE DRAWINGS

Two examples of test equipment according to the present invention and a method for using that equipment will now be described with reference to the accompanying drawing which is a schematic block diagram.

DETAILED DESCRIPTION OF EMBODIMENTS

The drawing illustrates an image processor (1) of conventional form which is connected to an input device (2) such as a digitizing table or keyboard for use by an operator. An image store (3), such as a disk store, is connected to the image processor (1) and contains digital data defining the color component content of each pixel of an image. The data may have been generated electronically or by scanning an original transparency, for example.

The image processor (1) enables the image in the store (3) to be processed in a conventional manner and then generates a half-tone version of that image and finally generates a Raster output signal for use in controlling a conventional output device such as the Crosfield Magnascan output device from a port (4). This Raster output signal generally has a binary form and is used to control a beam modulator in the output device (not shown) so as to control the on/off status of a radiation beam such as a laser beam which, in its on status, will impinge on a record medium.

In order to assess the performance of the image processor (1), two types of test equipment (5, 6) may be attached to the output (4) of the image processor (1). It is to be understood that these test equipments would not be attached at the same time but are alternatives shown for convenience together in the drawing.

The test equipment (5) comprises selector electronics (7) coupled to a Raster store (8) which in turn is coupled to a monitor (9). The selector electronics (7) receives the signals from the output (4) of the image processor (1) and using suitable timing electronics allows a proportion of the incoming signals to be fed through and stored in the Raster store (8). For example, the selector electronics (7) may be arranged by the operator using a computer system 12 to extract those signals corresponding to a single dot cell or a small number of dot cells. The content of the Raster store (8) is then displayed on the monitor (9), usually in enlarged form, following which the operator analyses the displayed dot or dots to check for errors. As mentioned above, these errors may lie in the size or shape of the dot or the dot angle. Following his analysis, the operator will carry out a suitable adjustment or repair on the image processor (1). Then, via the input device (2), the operator will regenerate the Raster signals from the port (4) which are again selected and stored and displayed. This process is then repeated until the display is satisfactory whereupon the test equipment (5) is disconnected and the image processor (1) can be later connected to a conventional output device.

The test equipment (6) is similar to the test equipment (5) in that it includes selector electronics (7), a Raster store (8), and a computer system 12. However, in this case, the monitor (9) is replaced by a comparator (10) which is also connected to a reference store (11). The reference store (11) stores reference data corresponding to data which is expected to appear in the Raster store (8). For example, in conventional Raster output signals, at the end of each line a check value or digit is provided. The reference store (11) may store these check values and the comparator (10) simply compares the values in the reference store (11) with those stored in the store (8) and provides an indication of whether or not they are the same. Of course, it would also be possible for the comparator to compare the contents of the two stores on a pixel by pixel basis but this will take much longer to achieve. Again, the operator can adjust the image processor (1) until the comparator (10) indicates that a fully successful comparison has been achieved.

I claim:

1. Test equipment for testing that image processing apparatus is operating correctly, said test equipment comprising selection means for coupling to an output port of said image processing apparatus; a memory for coupling to said selection means to receive digital signals from said image processing apparatus representing an image, said section means selecting a predetermined group of said signals for storage in said memory, said predetermined group of signals being a subset of said digital signals representing said image; and means coupled to said memory to enable said signals stored in said memory to be analyzed or automatically verified.

2. Test equipment according to claim 1 adapted to be positioned at the output of an input device or image store.

3. Test equipment according to claim 1, wherein said signals are intended to control an image generation system to generate said image.

4. Test equipment according to claim 1 wherein said output port to which said test equipment is connected generates Raster format signals.

5. Test equipment according to claim 1 including a monitor coupled to said memory for displaying the portion of said image represented by said predetermined group of said signals stored in said memory to enable said portion to be analysed by an operator.

6. Test equipment according to claim 1, wherein said means coupled to said memory to enable said signals stored in said memory to be analysed comprises comparison means connected to a store which holds reference signals corresponding to said predetermined group of signals in said memory, said comparison means comparing said reference signals in said store with said signals stored in said memory and providing an indication of a result of that comparison.

7. Test equipment according to claim 6, wherein said image processing apparatus is arranged to process a known image so that the comparison can be made.

8. Test equipment according to claim 6 wherein said comparison means compares check information corresponding to each line of said image stored in said memory.

9. A method of adjusting image processing apparatus to minimize operational errors said method comprising
   a) attaching test equipment, said test equipment comprising selection means for coupling to an output port of said image processing apparatus; a memory for coupling to said selection means to receive digital signals from said image processing apparatus representing an image, said selection means selecting a predetermined group of said signals for storage in said memory, said predetermined group of signals being a subset of said digital signals representing said image; and means coupled to said memory to enable said signals stored in said memory to be analyzed or automatically verified, to an output port of the image processing apparatus to receive digital signals from said image processing apparatus representing an image;
   b) storing selected signals in the memory;
   c) analyzing the selected signals stored in the memory;
   d) adjusting said image processing apparatus to compensate for any errors detected and repeating steps b) to d) until sufficient accuracy of said image processing apparatus is achieved, and thereafter removing said test equipment.

10. Test equipment according to claim 1, wherein said output port is normally connected, in use, to a display device.

* * * * *